United States Patent
Stevens et al.

(10) Patent No.: US 8,144,348 B2
(45) Date of Patent: Mar. 27, 2012

(54) SYSTEMS AND METHODS FOR MANAGING FAILED PRINT JOBS

(75) Inventors: Chad Stevens, Boise, ID (US); James Francis Gutierrez, Boise, ID (US); Robert Matthew Sesek, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2515 days.

(21) Appl. No.: 10/978,659

(22) Filed: Nov. 1, 2004

(65) Prior Publication Data

US 2006/0092433 A1    May 4, 2006

(51) Int. Cl.
G06K 15/00 (2006.01)
G06F 3/12 (2006.01)

(52) U.S. Cl. ...................... 358/1.15; 358/1.16
(58) Field of Classification Search .................. 358/1.14, 358/1.15, 1.16
See application file for complete search history.

(56) References Cited

U.S. PATENT DOCUMENTS

| | | | |
|---|---|---|---|
| 6,407,821 B1 * | 6/2002 | Hohensee et al. ........... | 358/1.15 |
| 6,782,535 B1 | 8/2004 | Dal-Santo | |
| 6,809,831 B1 * | 10/2004 | Minari ......................... | 358/1.15 |
| 7,180,623 B2 * | 2/2007 | Kato ............................ | 358/1.15 |
| 2002/0080389 A1 | 6/2002 | Carney | |
| 2002/0089688 A1 | 7/2002 | Ferlitsch | |
| 2002/0095351 A1 * | 7/2002 | Hitaka ............. | 705/26 |
| 2002/0097419 A1 * | 7/2002 | Chang et al. ................. | 358/1.13 |
| 2002/0097429 A1 | 7/2002 | Ferlitsch | |
| 2002/0113989 A1 | 8/2002 | Ferlitsch | |
| 2002/0131070 A1 | 9/2002 | Housel | |
| 2002/0186407 A1 * | 12/2002 | Laughlin ..................... | 358/1.15 |
| 2003/0167271 A1 | 9/2003 | Arnold | |
| 2003/0227644 A1 | 12/2003 | Ferlitsch | |
| 2004/0046986 A1 | 3/2004 | Kuwabara | |
| 2004/0070779 A1 | 4/2004 | Ferlitsch | |
| 2004/0136023 A1 | 7/2004 | Sato | |
| 2004/0150853 A1 | 8/2004 | Stodersching | |
| 2005/0030574 A1 * | 2/2005 | McVey et al. ................ | 358/1.14 |
| 2005/0195425 A1 * | 9/2005 | Bridges et al. ............... | 358/1.15 |

FOREIGN PATENT DOCUMENTS

JP    2003241948    8/2003

* cited by examiner

*Primary Examiner* — Twyler Haskins
*Assistant Examiner* — Fred Guillermety

(57) ABSTRACT

Disclosed are systems and methods for managing failed print jobs. In one embodiment, a method for managing a failed print job includes receiving a print job, detecting a printing device failure, recompiling the print job as a portable document file, and transmitting the portable document file to the user and/or to another device.

18 Claims, 5 Drawing Sheets

SYSTEMS AND METHODS FOR MANAGING FAILED PRINT JOBS

BACKGROUND

When a print failure occurs due to a problem with the selected printing device, the sender of the print job typically must either remedy the problem with the selected printing device and reinitiate the printing process, or send the print job to another printing device in order to obtain a hard copy document.

Although the above-described process is viable, it can be frustrating in situations in which the source file was a temporary file to which the user no longer has access. For example, if the file to be printed was an email attachment that was appended to an email message that the user deleted after attempting to print the attachment, the user may no longer have access to the file and may, therefore, need to request that the sender of the email message resend the attachment so that printing can attempted on another printing device. To cite another example, if the file was a web page (e.g., a purchase receipt) that was accessed via a web browser that the user closed after attempting to print the web page, the user may need to spend time trying to re-access the page, assuming that the page can even be re-accessed in the first place.

The aforementioned drawbacks can be solved using what is referred to in the art as dynamic job rerouting. With such rerouting, a print job that cannot be printed by a first printing device for whatever reason (e.g., a mechanical problem or empty paper tray) is automatically rerouted to another printing device for printing. Although such a solution enables generation of a hard copy document without requiring the user to relocate the source file and manually reinitiate the printing process, the user has little or no control over the print job. Therefore, sensitive documents, such as those comprising personal or confidential information, may be automatically output by a printing device over which the user has little control and/or that is shared by many different persons. This can also result in the user losing the output, or having difficulty in finding it when the print job is rerouted to another machine in an unknown location.

In addition to the potential for the undesired sharing of sensitive information that dynamic job rerouting can cause, dynamic job rerouting can be difficult to achieve and may be prone to failure given the complexity associated with converting machine bits used to print on a first printing device to machine bits that can be used to print on a second printing device. Therefore, dynamic job rerouting may require significant resources to configure and maintain in addition to the potential high cost of additional hardware needed for this rerouting.

SUMMARY

Disclosed are systems and methods for managing failed print jobs. In one embodiment, a method for managing a failed print job includes receiving a print job, detecting a printing device failure, recompiling the print job as a portable document file, and transmitting the portable document file to another device.

BRIEF DESCRIPTION OF THE DRAWINGS

The disclosed systems and methods can be better understood with reference to the following drawings. The components in the drawings are not necessarily to scale.

DETAILED DESCRIPTION

As is described above, existing solutions to print failure, such as manual resending to another printing device or dynamic job rerouting, comprise various disadvantages. As is discussed below, however, more effective print failure management can be obtained when, upon such a failure, the print job is recompiled as a portable document file that can, at least in some embodiments, be sent to the sender of the original print job or to another printing device. In such a case, the portable document can be sent to another printing device that is capable of directly printing the portable document without complex conversion.

Disclosed herein are embodiments of systems and methods for managing print failure. Although particular embodiments are disclosed, these embodiments are provided for purposes of example only to facilitate description of the disclosed systems and methods.

Figure 1:
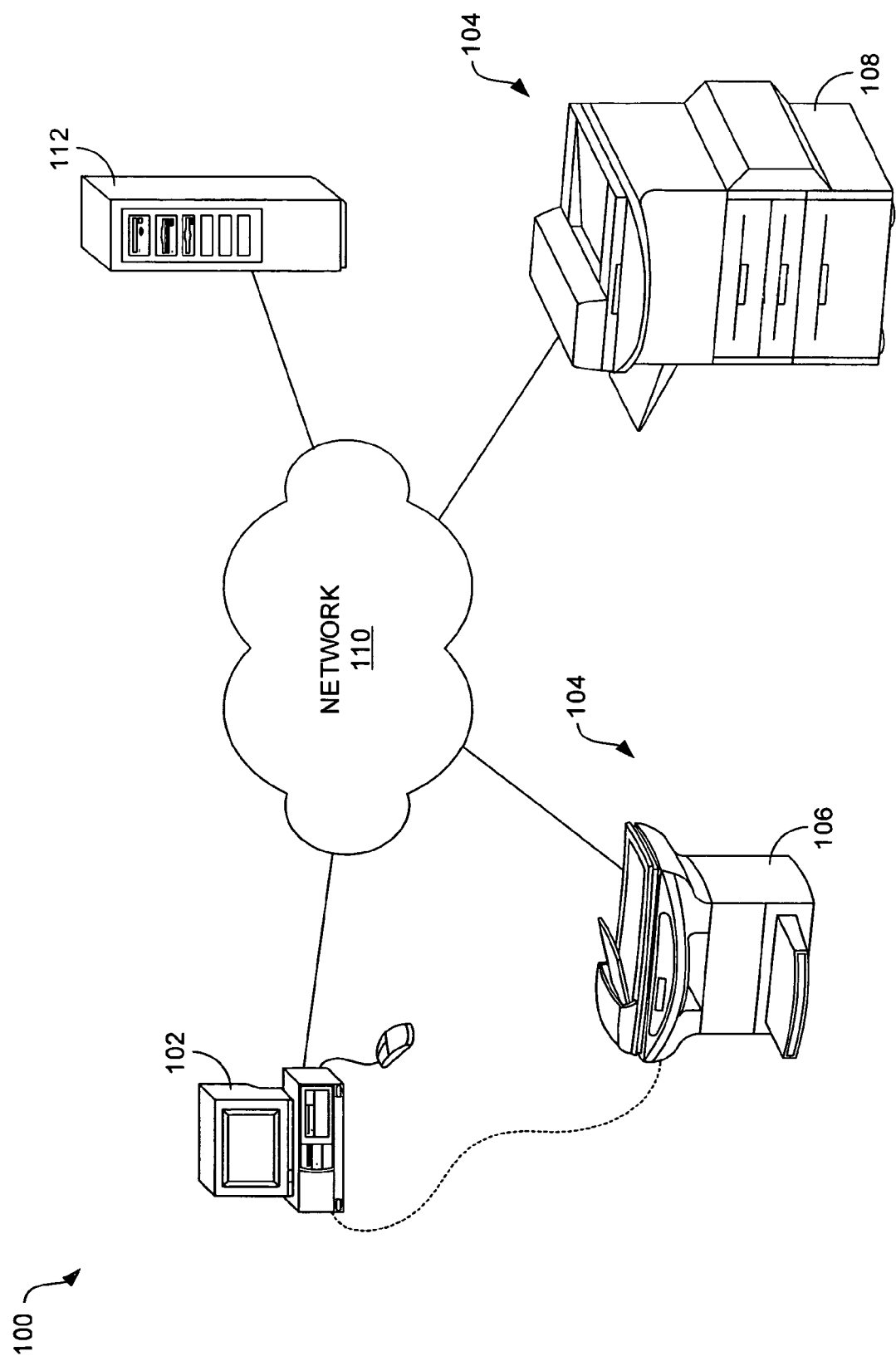
FIG. 1 is a schematic view of an embodiment of a system with which management of failed print jobs can be achieved.

Referring now in more detail to the drawings, in which like numerals indicate corresponding parts throughout the several views, FIG. 1 illustrates an example system 100. As is indicated in that figure, the system 100 generally comprises a user computer 102 and one or more printing devices 104. In the embodiment of FIG. 1, the user computer 102 comprises a personal computer (PC) that is configured to communicate with and control the devices 104. Although a PC is illustrated in FIG. 1 and has been explicitly identified herein, the user computer 102 can comprise a different type of computer, such as a notebook computer, a Macintosh™ type computer, or a personal digital assistant (PDA) or other print-enabled portable device such as a Blackberry™ device or print-enabled cellular phone. More generally, the user computer 102 comprises any device that can communicate print jobs to the printing devices 104.

The printing devices 104 are configured to receive print data and generate hard copy documents of the received print data. In the embodiment shown in FIG. 1, the printing devices 104 comprise a multi-function peripheral (MFP) device 106 and a printer 108. In that embodiment, both the MFP device 106 and the printer 108 are connected to a network 110. The network 110 can comprise a single network, such as a local area network (LAN), or may comprise a collection of networks (LANs and/or wide area networks (WANs)) that are communicatively coupled to each other. In some embodiments, the network 110 may comprise part of the Internet. In addition or in exception to being connected to the network 110, one or both of the printing devices 104 (e.g., the MFP 106) may be directly connected to the user computer 102.

Also shown connected to the network 110 in the embodiment of FIG. 1 is a further computer 112 that, for example, comprises a print server that receives print jobs from user computers, such as computer 102, and routes those print jobs to the printing devices 104. In at least some embodiments, the computer 112 is accessed and controlled by a network administrator, such as an information technology (IT) specialist.

Figure 2:
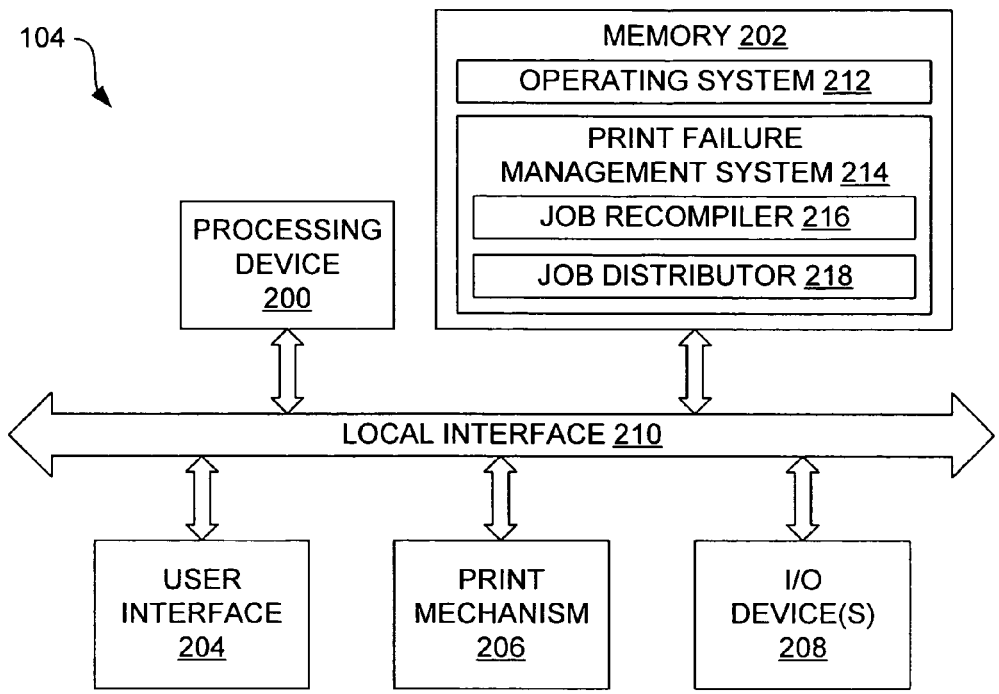
FIG. 2 is a block diagram of an embodiment of a printing device shown in FIG. 1.

FIG. 2 is a block diagram illustrating an example architecture for a printing device 104 shown in FIG. 1. As is indicated in FIG. 2, the printing device 104 comprises a processing device 200, memory 202, a user interface 204, a print mechanism 206, and at least one input/output (I/O) device 208. Each of those components is connected to a local interface 210.

The processing device 200 is adapted to execute commands stored in memory 202 and can comprise a general-purpose processor, a microprocessor, one or more application-specific integrated circuits (ASICs), a plurality of suitably configured digital logic gates, or other electrical configurations comprised of discrete elements both individually and in various combinations to coordinate the overall operation of the printing device 104. The memory 202 comprises any one or a combination of volatile memory elements (e.g., random access memory (RAM)) and nonvolatile memory elements (e.g., read-only memory (ROM), Flash memory, hard disk, etc.).

The user interface 204 comprises the tools with which the device settings can be changed and through which the user can directly communicate commands to the printing device 104. By way of example, the user interface 204 comprises one or more function keys contained within a device control panel. Such a control panel may further include a display, such as a liquid crystal display (LCD) or light emitting diode (LED) display. This control panel could also include hard key buttons in combination with a display.

The print mechanism 206 includes the hardware components that perform the print process. For example, in cases in which the printing device 104 is a laser printer, the print mechanism can include a photoconductor member, a charging apparatus, a laser, a paper delivery mechanism, etc.

The one or more I/O devices 208 facilitate communications with other devices and may comprise one or more of a universal serial bus (USB) or a small computer system interface (SCSI) connection component, parallel cable (IEEE 1284), as well as one or more network communication devices such as a modulator/demodulator (e.g., modem), network card, wireless (e.g., RF) transceiver, or other such communication component.

The memory 202 includes various programs including an operating system (O/S) 212 and a print failure management system 214 that, as is described below, comprises logic that is configured to determine when a print failure occurs and, in response, recompile one or more print jobs as portable document files, for instance using a job recompiler 216. Once the print job or jobs have been recompiled in this manner, the job(s) can be distributed from the printing device 104, for instance using a job distributor 218. In some cases, the recompiled job can be sent back to the original sender or to a designated agent of the sender. In other cases, the recompiled job can be redirected to a printing device that is capable of printing the document. Examples of operation of the print failure management system 214 are discussed in relation to FIGS. 4-5 below.

Figure 3:
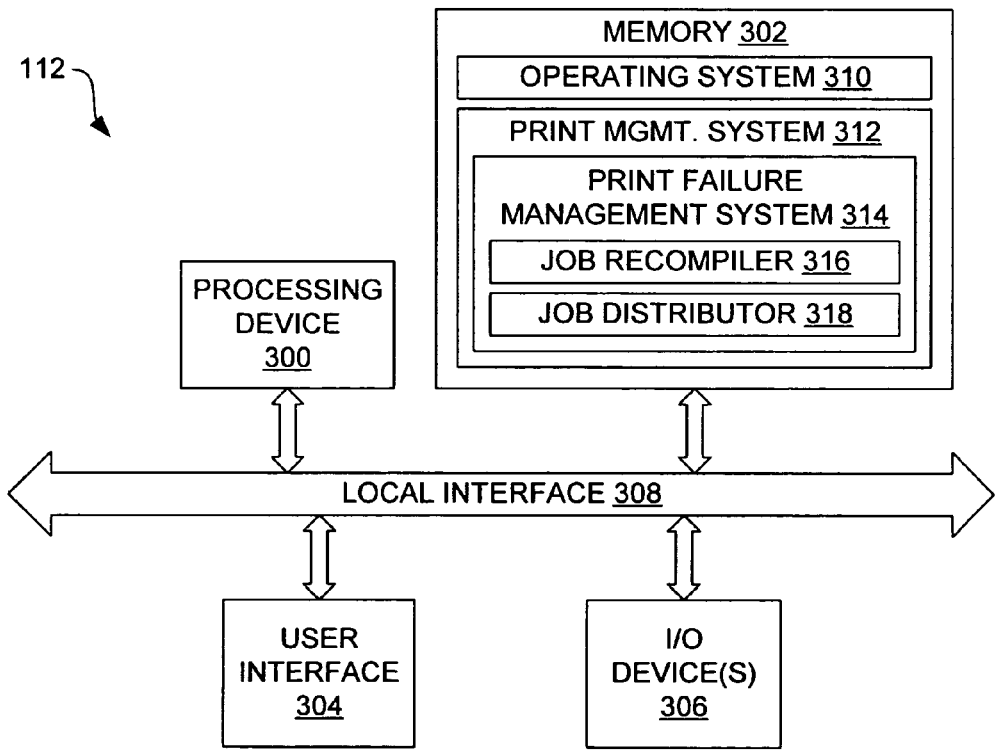
FIG. 3 is a block diagram of an embodiment of a computer shown in FIG. 1.

FIG. 3 is a block diagram illustrating an example architecture for the computer (e.g., print server) 112 shown in FIG. 1. As is indicated in FIG. 3, the computer 112 comprises a processing device 300, memory 302, a user interface 304, and at least one I/O device 306, each of which is connected to a local interface 308.

The processing device 300 can include a central processing unit (CPU) or an auxiliary processor among several processors associated with the computer 112, or a semiconductor based microprocessor (in the form of a microchip). The memory 302, includes any one of or a combination of volatile memory elements (e.g., RAM) and nonvolatile memory elements (e.g., hard disk, ROM, tape, etc.).

The user interface 304 comprises the components with which a user (e.g., network administrator) interacts with the computer 112. The user interface 304 may comprise, for example, a keyboard, mouse, and a display, such as a cathode ray tube (CRT) or liquid crystal display (LCD) monitor that may or may not be utilized as a touch screen input. The one or more I/O devices 306, like devices 208 (FIG. 2), are adapted to facilitate communications with other devices and may include one or more of a USB or a SCSI connection component, as well as one or more communication components such as a modulator/demodulator (e.g., modem), wireless (e.g., radio frequency (RF)) transceiver, network card, etc.

The memory 302 comprises various programs including an operating system (O/S) 310 and a print management system 312. The O/S 310 controls the execution of other programs and provides scheduling, input-output control, file and data management, memory management, and communication control and related services. The print management system 312 is configured to manage and route print jobs on the network 110. The system 312 comprises a print failure management system 314 that operates in similar manner to the print failure management system 214 described above in relation to FIG. 2. Therefore, like system 214, the print failure management system 314 can comprise a job recompiler 316 and a job distributor 318. Operation of the print failure management system 314 is discussed below in relation to FIGS. 4-5.

Various programs (i.e. logic) have been described herein. These programs can be stored on any computer-readable medium for use by or in connection with any computer-related system or method. In the context of this document, a computer-readable medium is an electronic, magnetic, optical, or other physical device or means that contains or stores a computer program for use by or in connection with a computer-related system or method. These programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

Example systems having been described above, operation of the systems will now be discussed. In the discussions that follow, flow diagrams are provided. Process steps or blocks in these flow diagrams may represent modules, segments, or portions of code that include one or more executable instructions for implementing specific logical functions or steps in the process. Although particular example process steps are described, alternative implementations are feasible. Moreover, steps may be executed out of order from that shown or discussed, including substantially concurrently or in reverse order, depending on the functionality involved.

Figure 4:
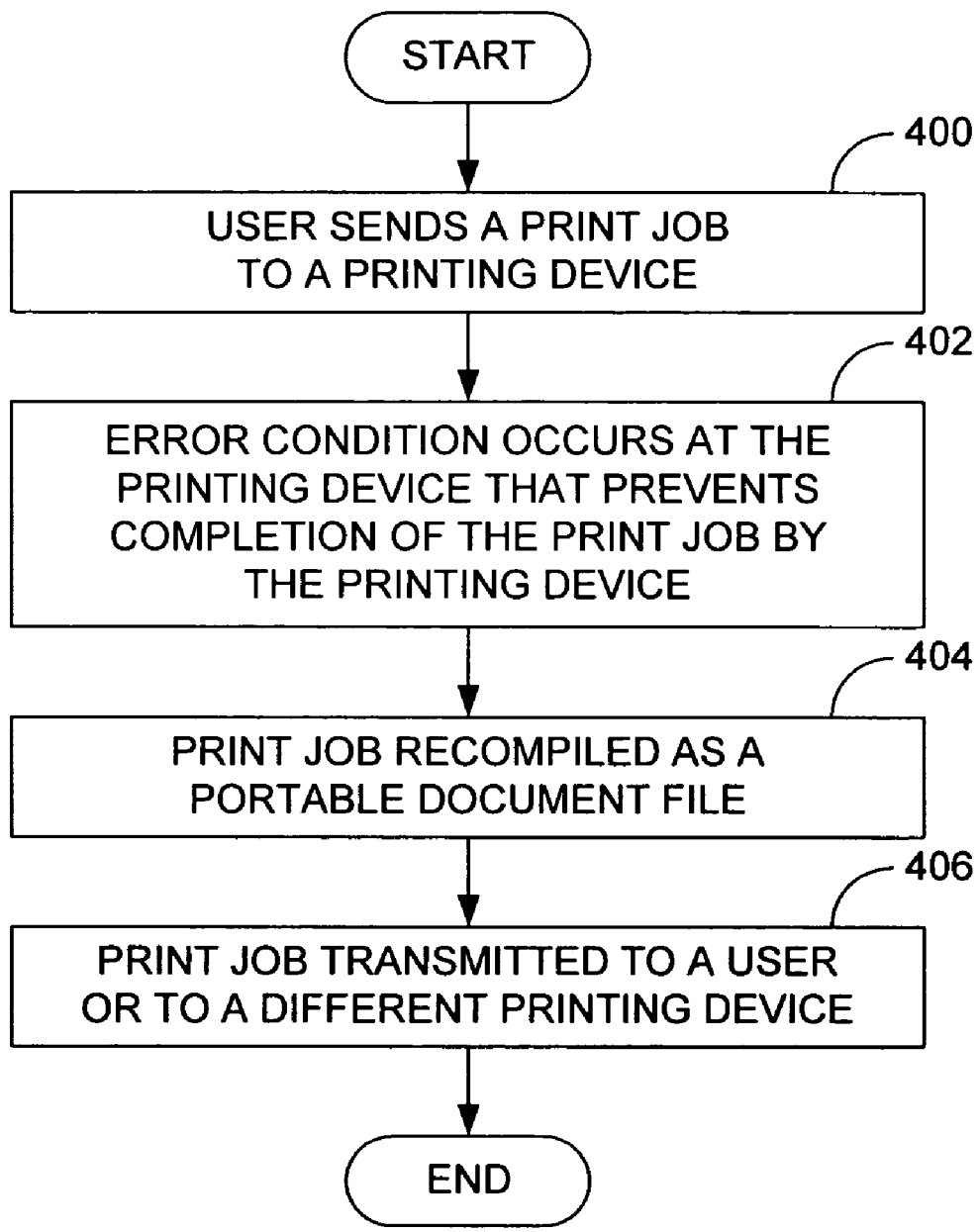
FIG. 4 is a flow diagram that illustrates an embodiment of a method for managing a failed print job.

FIG. 4 illustrates an embodiment of a method for managing a failed print job. Beginning with block 400, a user sends a print job to a printing device, such as a printing device 104 shown in FIG. 1. For instance, a user selects a "print" option from an appropriate user application that executes on the user computer 102. After the print job is transmitted, an error condition occurs at the printing device that prevents completion of the print job by the printing device, as is indicated in block 402. Such an error condition can take many forms. By way of example, the error condition can comprise a hardware failure or malfunction, such as a paper jam. In addition, the error condition can relate to depletion of a given printing device consumable, such as toner, ink, or paper. Generally speaking, the error condition can comprise any condition that disables the printing device to the extent that the printing device cannot generate a hard copy document from the print job.

When such an error condition occurs, the print job is recompiled as a portable document file, as is indicated in block 404. As is used herein, the term "portable document file" designates a file format that captures formatting information such that the particular format of the document is retained when the file is transmitted from device to device. One example of a portable document file is a portable document format (PDF) file, such as an Adobe PDF file. As is known in the art, many modern printing devices are configured to directly print PDF files without further application intervention. In other words, PDF files are print-ready files that can be printed by several printing devices without translation by a device driver.

In some embodiments, the recompiling process is performed on machine language bits at the printing device that was originally selected to print the print job. In other embodiments, the recompiling process is performed on the print job by a computer that routes the print job to the printing device, such as computer 112 (FIG. 1).

Irrespective of which component performs the recompilation, the portable document file can be transmitted to a user or to a different printing device, as is indicated in block 406. As for transmission to a user, the file can be transmitted back to the sender who originally initiated the printing process (i.e., sent the print job). Alternatively, the file can be transmitted to a designated agent of the sender, such as a network administrator or other designated user such as an administrative assistant or co-worker. As for transmission to a different printing device, the file can be transmitted to a printing device that is capable of directly printing the file and that is not experiencing an error condition that would prevent such printing. The portable document file could be sent to any combination of these destinations.

The destination to which the portable document file is sent can be controlled by the user. In cases in which the recompiling is performed by the printing device that was originally selected to print the print job, the destination for the portable document file can be selected as a default setting, for instance using the user interface of the device, or can be set remotely through the I/O device. In such a case, all portable document files that are generated due to a print job failure are sent to a selected destination by default. In other embodiments, the destination for the portable document file can be selected using a device driver or other application at the user computer (e.g., user computer 102, FIG. 1). For example, the user (i.e., print job sender) can establish a default setting similar to that described above such that all generated portable document files are sent to a given destination (e.g., a different printing device). Alternatively, or in addition, the user can manually override the default or can be prompted for the desired destination by the device driver just prior to sending the print job to the printing device. In such a case, the user can control where recompiled files are sent on a job-by-job basis. Accordingly, by way of example, the user may specify that a portable document file generated as a result of a printing device failure be sent back to the user if the print job contains confidential information, but specify that the portable document file be sent to a different printing device if the print job does not include confidential information.

Figure 5A:
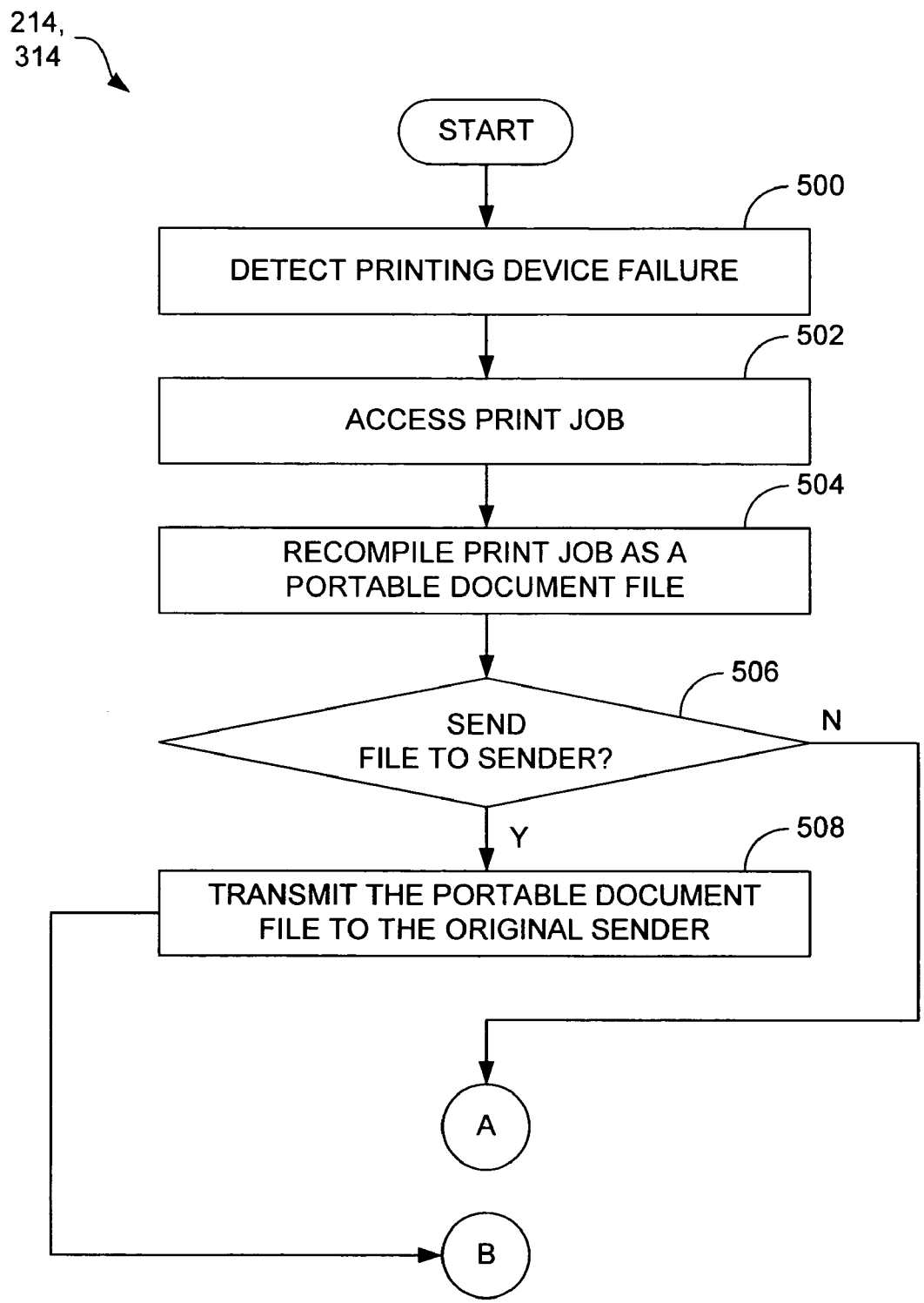
FIGS. 5A and 5B is a flow diagram that illustrates an embodiment of operation of a print failure management system of the printing device of FIG. 2 or the computer of FIG. 4.
Figure 5B:
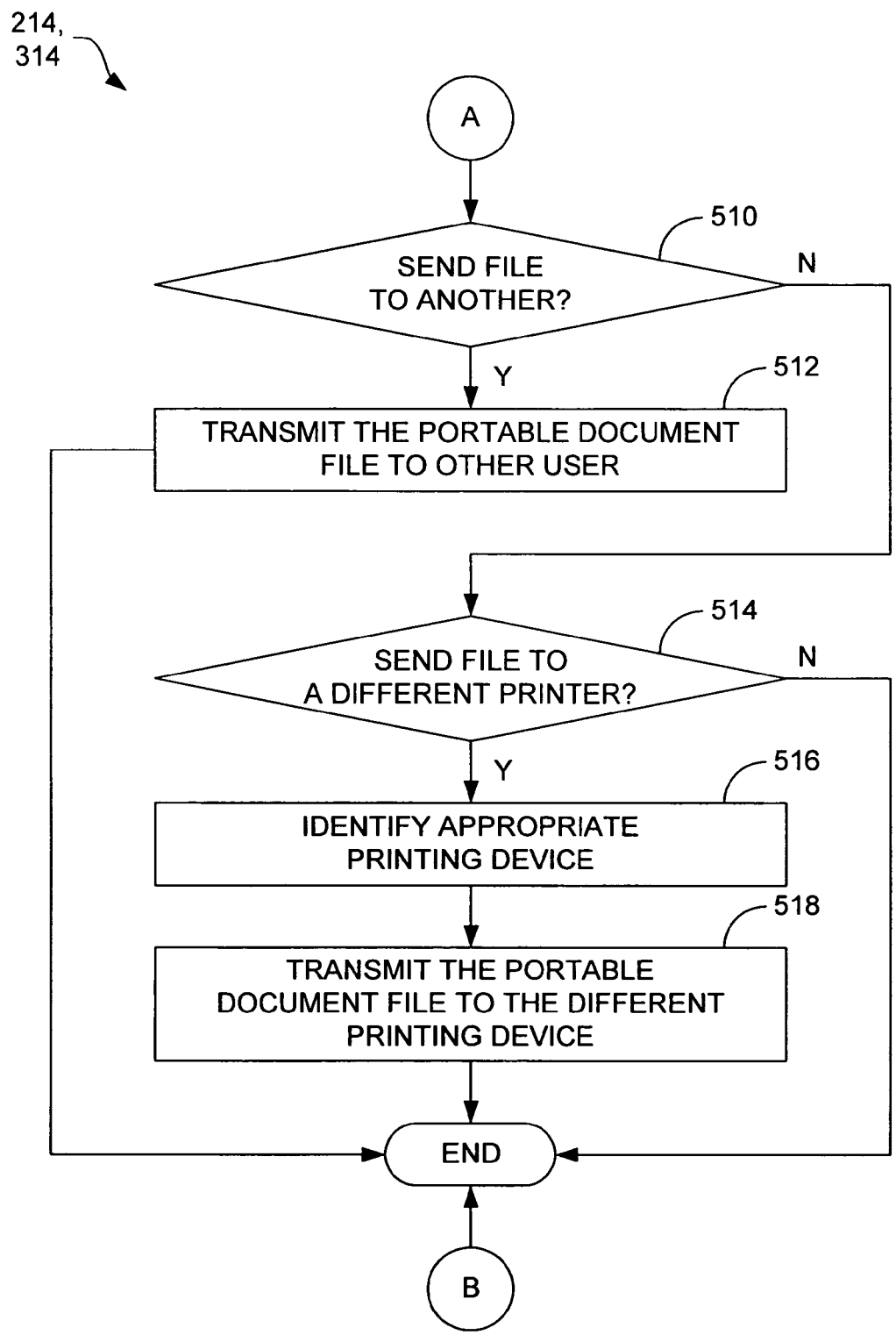

FIGS. 5A and 5B describe an example of operation of a print failure management system. The system may comprise the print failure management system 214 of the printing device 104 (FIG. 2) or the print failure management system 314 (FIG. 3) of the computer 112. As will be described in the following, the flow for each scenario is similar.

Beginning with block 500 of FIG. 5A, the system 214, 314 detects a printing device failure. In cases in which the system executes on the printing device 104 (i.e., system 214), such detection is made internally at the printing device. In cases in which the system executes on the computer 112 (i.e., system 314), detection can comprise receiving an error message at the computer that indicates that an error has occurred at the printing device 104.

In either case, the system 214, 314 accesses the print job that the printing device was to print, as is indicated in block 502. In situations in which the system executes on the computer 112 (i.e., system 314), the print job can have, for example, been stored locally on the computer, for instance until an indication that the print job was successfully printed is received. Alternatively, the system 314 can receive the print job from the printing device 104 after the printing device experienced the error.

Once the print job has been accessed, the system 214, 314 recompiles the print job as a portable document file, as is indicated in block 504. This process can be accomplished in the same manner as that described above in relation to FIG. 4. In some embodiments, the various attributes of the print job are embedded into the portable document file that is created. For example, if the user had specified three copies to be generated using double-sided printing, those print job attributes could be stored in the portable document file, for instance in a header of the file. In such a case, the job attributes can be readily determined by a different printing device that receives the portable document file. In other embodiments, the job attributes can be stored in a separate file (e.g., a separate portable document file) for transmission along with the portable document file to a user, such as the original sender or network administrator.

Referring next to decision block 506, the system 214, 314 determines whether to send the portable document file to the original sender. As is described above, such an option may be desirable, and may have been explicitly selected by the sender, in cases in which the print job comprises confidential information. If the file is to be sent to the original sender, the file is transmitted to the sender, as is indicated in block 508. The nature of this transmission can take several different forms. By way of example, the transmission comprises an email message that includes the portable document file as an attachment. In such cases, the email address can have been provided to the system 214, 314 in a header of the print job (e.g., along with the print job attributes). If the portable document file does not include embedded job attributes, the print job attributes can, optionally, be provided to the sender in the same email message, for example as a separate file attachment or in the body of the email message text.

In some embodiments, appropriate security measures can be used to limit access to the portable document file. For example, a secure personal identification number (PIN) or other code can be embedded into the portable document file such that the information contained in the file can only be accessed if the correct PIN or other code is entered. Such an arrangement may be desirable in situations in which there is concern that unauthorized persons may gain access to the original sender's computer (e.g., user computer 102, FIG. 1) as well as in cases when the user computer is a public computer.

Referring back to decision block 506, if the portable document file is not to be sent to the original sender, flow (in this example) continues to decision block 510 of FIG. 5B at which the system 214, 314 determines whether to send the portable document file to another user. Such an option may be desirable in cases in which the print job does not contain confidential information and the original sender would like another person, such as the network administrator, administrative assistant, etc., to determine what other printing device is most appropriate to print the job in terms of device capability and/or availability.

If the file is to be sent to the other user, the file is transmitted to that user, as is indicated in block 512. Again, this transmission can comprise an email message that includes the portable document file as an attachment and, optionally, a further file that comprises the print job attributes.

If the portable document file was not to be sent to the original sender or another user, flow continues down to decision block 514 at which the system 214, 314 determines whether to send the portable document file to a different printing device. Such an option may be desirable in cases in which the print job does not contain confidential information and the original sender is less concerned about which printing device is used than about the job simply being completed.

If the file is to be sent to a different printing device, the system 214, 314 first identifies an appropriate printing device to which to send the portable document file, as is indicated in block 516. By way of example, this determination is made using a lookup process in which the attributes of the print job are cross-referenced against known, available printing devices that have been designated as defaults by a network administrator. If defaults are used, these preset defaults may be overridden by the user if desired. Accordingly, an appropriate "match" can be made between the print job and the substitute printing device that will be used to complete the print job.

Once an appropriate printing device is identified, the system 214, 314 transmits the portable document file to that printing device, as is indicated in block 518, so that that device can print out a hard copy document. At that point, flow for the management session is terminated. Notably, in the present example, flow for the session is also terminated if the portable document file is transmitted to the original sender or another user. In alternative embodiments, however, the portable document file can be transmitted to a user and to a different printing device, if desired.

In view of the foregoing disclosure, the systems and methods described herein can be used to provide rerouting of failed print jobs without surrender of control over the print jobs. In situations in which a portable document file is delivered back to the original sender, the sender has a copy of the print job that he or she can immediately send to another printing device, hold for later transmission to a printing device (including the originally-selected printing device), or simply store and not print. In situations in which the portable document file is directly transmitted from the originally-selected printing device to a substitute printing device, rerouting is simplified given that the file is provided to the substitute printing device in a common format that can be directly printed without complex translation.

What is claimed is:

1. A method for managing a failed print job, the method comprising:
   receiving a print job transmitted from a user computer, the print job containing a document that is to be printed;
   detecting a printing device failure;
   responsive to the failure, recompiling the print job as a portable document file representing a full-scale version of the document and transmitting the portable document file back to the user computer to enable a user to transmit the portable document file to an alternative printing device for printing.

2. The method of claim 1, wherein detecting a printing device failure comprises detecting a hardware malfunction of the printing device.

3. The method of claim 1, wherein detecting a printing device failure comprises detecting depletion of a printing device consumable.

4. The method of claim 1, wherein recompiling the print job comprises recompiling the print job on the printing device that experienced the failure.

5. The method of claim 1, wherein recompiling the print job comprises recompiling the print job on a print server that routes print jobs to the printing device that experienced the failure.

6. The method of claim 1, wherein recompiling the print job comprises recompiling the print job as a portable document format (PDF) file.

7. The method of claim 1, wherein recompiling the print job comprises embedding print job attributes in the portable document file.

8. The method of claim 1, wherein transmitting the portable document file comprises transmitting the portable document file as an attachment of an email message.

9. A method for managing a failed print job, the method comprising:
   enabling a user on a user computer to select a destination device to which to redirect a print job in the case of a printing device failure;
   receiving a print job transmitted from the user computer;
   detecting a printing device failure; and
   responsive to the failure, recompiling the print job as a portable document file and transmitting the portable document file to the destination device selected by the user on the user computer.

10. The method of claim 9, wherein enabling a user comprises enabling the user to select the destination device using a driver for the printing device that executes on the user computer.

11. The method of claim 10, wherein enabling the user to select the destination device comprises enabling the user to select the destination device relative to each print job that is transmitted so that a desired destination device can be selected by the user on a job-by-job basis.

12. A computer-readable medium that stores a management system comprising:
   logic configured to receive via a network a print job and a user selection of a destination device to which to redirect the print job in the case of a printing device failure;
   logic configured to detect a printing device failure; and
   logic configured to, responsive to the failure, recompile the print job as a portable document format (PDF) file and transmit the PDF file to the selected destination device.

13. The computer-readable medium of claim 12, wherein the logic configured to recompile the print job comprises logic configured to embed print job attributes in the PDF file.

14. The computer-readable medium of claim 12, wherein the logic configured to transmit the PDF file comprises logic configured to transmit the PDF file as an attachment of an email message.

15. A printing device, comprising:
   a processing device;
   a print mechanism; and
   memory that includes a print failure management system, the management system being configured to receive along with print jobs transmitted over a network to the printing device a user selection of a destination device to which to redirect the print job in the case of a printing device failure, to detect a printing device failure, to recompile the print jobs as portable document format (PDF) files, and to transmit the portable document files to the selected destination devices.

16. The device of claim 15, wherein the management system is further configured to embed print job attributes in the PDF file.

17. The device of claim 15, wherein the management system is further configured to transmit the PDF file as an attachment of an email message.

18. The device of claim 15, wherein the management system is configured to transmit the PDF file to a different printing device.

* * * * *